Oct. 3, 1939.     P. H. TERRY ET AL     2,174,931
METHOD AND APPARATUS FOR THE PRODUCTION OF MOTION
PICTURE FILMS OF THE ANIMATED CARTOON TYPE
Filed June 18, 1936     2 Sheets-Sheet 1
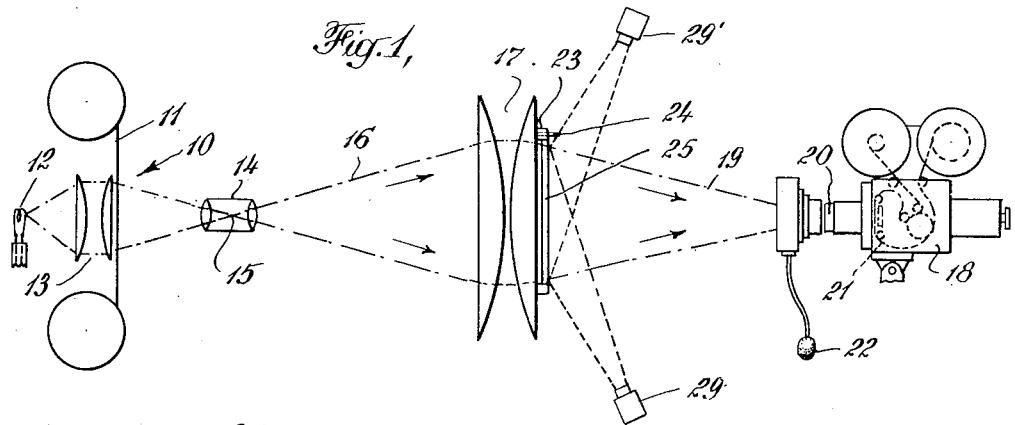
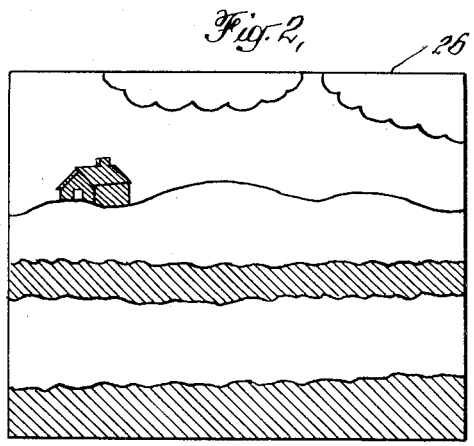 
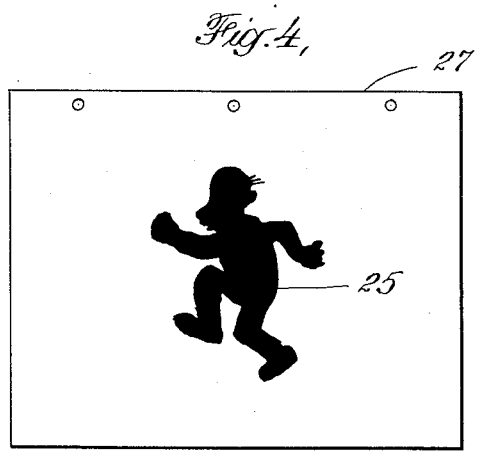
INVENTOR
PAUL H. TERRY
CARL LOUIS GREGORY
BY
Annie, Davis, Marvin & Edmonds
ATTORNEYS

INVENTOR
PAUL H. TERRY
CARL LOUIS GREGORY
BY
ATTORNEYS

Patented Oct. 3, 1939

2,174,931

UNITED STATES PATENT OFFICE 2,174,931

METHOD AND APPARATUS FOR THE PRODUCTION OF MOTION PICTURE FILMS OF THE ANIMATED CARTOON TYPE

Paul Houlton Terry, Larchmont, and Carl Louis Gregory, New Rochelle, N. Y.; said Gregory assignor to said Terry Application June 18, 1936, Serial No. 85,858

21 Claims. (Cl. 88—16)

This invention relates broadly to the photographic combining and recording of separately prepared foreground and background scenes on a single area of a photographically sensitive surface. More particularly, the invention relates to the production of motion picture film of the animated cartoon type, and provides a method and apparatus for the recording of such film by the incorporation of desired pictorial or cartoon representations with a separately recorded background scene with increased facility, speed, and artistic perfectness. The invention is particularly adapted for use with background scenes recorded on standard motion picture film, and contemplates the direct incorporation, by photographic means, of ordinary size cartoon drawings with a background of a natural physical scene recorded on motion picture film.

Cartoon films depend for their appeal, to a large extent, on the natural liking of the average person for caricature, and on the novelty which the ingenuity of the producer is able to present. It has therefore been thought highly desirable to produce animated cartoon films in which the various cartoon characters disport themselves in a background of a natural physical scene. Such a physical scene is preferably recorded on motion picture film. Cartoon characters, however, are customarily drawn on cartoon cells of much larger size than a motion picture film-frame, usually of the order of 8 by 11 inches. Therefore a means for combining the large scale cartoon characters with the small scale background scene is necessary. Also, the means should be such as will produce the desired combining without impairing the detail and artistic merit of either the cartoon representation or the background scene.

In producing such a film, facility, speed and economy are also important. The art of producing and recording film of the animated cartoon type is one which inherently involves considerable tedious, laborious and time-consuming work. As many as 6000 separate cartoon drawings are often required, at the present time, for cartoon films of ordinary length (500 feet), and the production of these drawings and their incorporation with an appropriate background setting in a rapid, efficient and artistically perfect manner has taxed the ingenuity of workers in the art for many years. The present invention is particularly advantageous in that it offers a method and apparatus for increasing the speed and economy of recording such film without sacrificing, and indeed enhancing, the perfectness with which the cartoon action is incorporated with the background scene.

It has previously been proposed to produce cartoon films by preparing a film on which a background scene is recorded, and projecting this scene onto a ground glass plate. Desired cartoon characters are placed on the ground glass plate in their proper position with respect to the projected background scene, the cartoon characters being opaque to the projected light. A camera is then focussed on the ground glass plate and two exposures are made of the film in the camera. One exposure is with the projection lamp on and no illumination of the cartoon characters, and the other with the projection lamp off, the ground glass covered with black velvet, and surface illumination on the cartoon characters.

This apparatus is subject to several disadvantages. The ground glass plate diffuses the projected beam of light in all directions so that only a small portion of the projected beam of light reaches the camera. This makes the optical system very inefficient and slow. Furthermore, the transmission characteristic of a ground glass plate is such that those portions of a projected beam of light which pass through the plate and reach a given point without requiring substantial diversion are much more intense than those portions which reach the same point from other parts of the ground glass plate and do require diversion. Thus those portions of the projected beam of light which reach the camera from the central portion of the ground glass plate, requiring little or no diversion, are much more intense than portions from other parts of the ground glass plate. As a result the central portion of the projected enlarged image will be brighter than the outer portions and may adversely affect the quality of the photographed image in the camera, unless other means are provided to compensate for the non-uniform characteristic of the ground glass. Also, the covering and uncovering of the ground glass for successive exposures is time-consuming and hence undesirable.

The present invention is designed to accomplish the desired results without the disadvantages just mentioned. In accordance with the invention an enlarged image of a recorded background scene is projected to an image plane, which is at a suitable point between the projector and a camera. The projected rays which form the enlarged image are converged to the camera by means of converging optical means of large diameter, preferably a large diameter lens.

In the path of the projected light rays near the image plane is placed an opaque pictorial or cartoon representation which it is desired to incorporate with the background scene. This representation shows desired detail at the side thereof toward the camera. The camera is then focussed so as to record both the pictorial representation and the portion of the projected image not masked thereby. In order to obtain an image in the camera which is as clear and sharp as possible, the plane of the projected image and the plane of the pictorial representation are made to coincide so that the camera can be focussed precisely on both the image and pictorial representation.

The size of the projected image is such as will give the desired relative size between background and foreground objects; that is, the enlarged image corresponds in size to the pictorial representation. The projected image must therefore be many times the size of the image on the film in the projector, and the projected beam of light must diverge as it leaves the projector. In the absence of suitable means for redirecting the projected rays, only a very small portion of them would reach the camera and impinge on the film therein, and these rays would be from only the center portion of the projected image, assuming that the projector and camera are exactly in line. Therefore, the present invention provides a large converging optical system, such as a large diameter lens, which converges the rays of light forming the enlarged image to the camera and thereby enables the camera to record the projected scene in its entirety.

The large lens is preferably placed as near the plane of the enlarged image as possible, in order to minimize aberrations introduced thereby, and in order to avoid the use of a larger lens than is necessary.

In the preferred embodiment of the invention a substantially point source of light is used as the projection source and the condenser in the projector focusses the rays from this source into the projection lens. The image of the projection source at the projection lens is in turn imaged at the objective of the camera by the large diameter lens. At the same time the projected background scene is imaged by the projection lens just beyond the large lens at the aforementioned image plane. This relationship of the images of the projection source and background film is very important in this embodiment of the invention.

As previously mentioned, one serious disadvantage of previous apparatus of this general character, in which a plate of ground glass is employed, is the uneven illumination or "hot spot" due to the projection source being on a line with the camera, in conjunction with the transmission characteristic of ground glass. This difficulty is completely eliminated in the apparatus of the present invention by the use of the large diameter lens mentioned hereinbefore. Also, the use of the large diameter lens permits the direct photographing of a large projected aerial image by the camera, which is not the case when a ground glass plate is used.

In order to secure the proper recording of the pictorial representation on the film in the camera, means such as spotlights are provided for illuminating the detailed side of the representation, which is toward the camera. The desired recording is thus produced by light reflected from the detailed surface of the representation of the camera.

In order to converge rays from all parts of the projected image to the camera, a lens of considerable diameter, for example, 16 or 18 inches, is required. Lenses of this size are very expensive, especially if they are corrected for aberrations. To minimize the expense, a pair of plano-convex lens elements placed with their convex surfaces toward each other are preferably employed, since such a system is sufficiently corrected without necessitating specially ground surfaces.

In some instances difficulty may arise due to light from the spotlights used to illuminate the pictorial representation being reflected from one or more surfaces of the large lens into the camera, thereby impairing the recorded image. In cases where it is necessary or desirable to avoid these reflections the invention contemplates placing a light filter, for example, a color filter, between the large lens and the pictorial representation. This light filter is selected so as to transmit at least a portion of the projected beam of light but to be substantially opaque to the light used to illuminate the pictorial representation. Thus no light from the spotlights is allowed to reach the surfaces from which reflection is to be avoided.

In the preferred practice of the invention the background and foreground are simultaneously recorded on a single area of film in the camera. This is accomplished by turning on the projection source and the spotlights which illuminate the detailed surface of the pictorial representation, adjusting the two light sources until the proper balance between foreground and background illumination is obtained, and then exposing the film in the camera.

By the above described procedure and apparatus the pictorial representation may be conveniently and precisely incorporated with an appropriate background setting with desirable speed and economy. Successive pictorial representations may be incorporated with the same or successive images of the background scene by the exposure of successive film frames in the camera to the desired projected background scene and to reflected light from the appropriate opaque pictorial representations.

A better understanding of the method and apparatus of the invention will be obtained by reference to the accompanying drawings, which illustrate a preferred embodiment thereof, taken in conjunction with the following description.

In the drawings:

Fig. 1 is a diagrammatic view of apparatus including a projector, a large lens and a camera for producing moving picture film according to this invention;

Fig. 2 illustrates a projected enlarged positive image of a recorded background scene;

Fig. 3 illustrates a transparent sheet or cell on which is depicted an opaque cartoon character;

Fig. 4 illustrates the appearance of the sheet of Fig. 3 when held in front of a light, and with little or no illumination on the front surface thereof;

Figure 5:
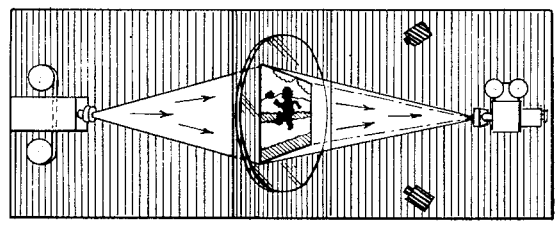
Fig. 5 is a top view in perspective of the apparatus shown in Fig. 1 with the projector on but in the absence of other illumination.

Referring to Fig. 1, a projector 10 of suitable type is threaded in the usual manner with a positive print of a motion picture film 11 to be projected. A suitable background scene is recorded on this film preferably one of a natural physical scene, although other scenes can be used if desired. Light for projecting the image is supplied by a suitable point source of light 12 in the projector 10. Light emitted from source 12 is focussed by a suitable condensing lens 13 into the projection lens 14 and forms an image 15 thereat. When the source is energized the projected beam of light emerges from the projector in the form of an enlarging cone of light 16.

In the path of the projected beam of light, and at a suitable distance in front of the projector, is positioned a converging lens 17, of comparatively large diameter. This lens is so designed and positioned with respect to the projector 10 and camera 18 as to cause the projected beam of light, which is diverging as it reaches the lens, to converge toward the camera in the form of a cone of diminishing cross section 19, and form an image of the projection source image 15 substantially at the objective 20 of camera 18. By this means all, or nearly all, of the projected rays of light may be caused to impinge on the film 21 in camera 18, thereby permitting a comparatively short exposure to be used. Camera 18 may be of any suitable type, preferably a motion picture camera of the stop-motion type. In Fig. 1 the shutter is shown operated by a suitable bulb 22.

Near the surface of lens 17, on the side thereof toward the camera 18, is provided any suitable means, such as a frame 23 and registering pins 24, for holding a cartoon representation 25 in proper position in the projected beam of light. Such a cartoon representation is illustrated in Fig. 3.

The image projected by the projector 10 is preferably focussed at an image plane which coincides with the plane of the cartoon representation 25. The camera 18 can then be focussed precisely on both the projected image and the cartoon representation, thereby obtaining desired sharpness of outline in the recorded image. Also, the large lens 17 is preferably placed near the image plane at which the projected image is focussed so that the effect of any aberrations in the lens is minimized. If the lens is placed in this position it need not be highly corrected optically, and therefore a comparatively inexpensive lens may be employed. The diameter of the lens corresponds to the size of the projected image, which in turn is determined by the size of the cartoon representation.

If a background scene on film 11 is projected, in the absence of a cartoon representation 25, an enlarged aerial image 26 thereof, such as is illustrated in Fig. 2, may be seen from the point of view of the camera. This enlarged image will appear to be at the image plane near the large lens. It should be noted that only at the position of the camera could a person see all parts of the enlarged image, since only at that point are light rays from all parts of the enlarged image converged. For any other position of observation the image could be rendered visible by placing a translucent screen in the image plane, thereby facilitating focussing, etc.

Fig. 3 shows a cartoon cell comprising a cartoon representation 25 drawn on a sheet of transparent material 27, such as Celluloid, etc. The cell has a number of holes 28 spaced to cooperate with registering pins 24 of Fig. 1. The cartoon is drawn to show desired detail at the side of sheet 27 which is to face toward the camera, and is rendered opaque to light from the projector by suitable masking. Preferably the cartoon itself is drawn on the surface which is to face the camera, and the masking effected by applying a suitable opaque paint or ink to the back of the sheet 27 in registry with the cartoon. In Fig. 3 the opaque paint is represented by the stippling on the clear portions of the cartoon representation. If the opaque paint is white then no white ink or paint need be used on the front of the sheet, since reflected light from the opaque backing will furnish desired white detail.

When this is done the cartoon representation will appear as a black silhouette when the cell is held before a light with no illumination on the front detailed surface of the cartoon. This is illustrated in Fig. 4. In order to bring out the detail in the cartoon when the cell is placed in position over the large lens of Fig. 1, spotlights 29 and 29' are provided to illuminate the side of the cartoon toward the camera. When the spotlights are on, the camera can take a picture of the cartoon by reflected light therefrom.

In Fig. 1 it will be noted that the projected rays from the projector 10 impinge only on the side of the cartoon representation 25 toward the projector, and do not impinge on the side toward the camera. Thus the photographing of those portions of the projected background scene which coincide with the opaque cartoon representation, and which might produce photographable images if projected onto the side of the cartoon representation toward the camera since a cartoon commonly contains large light-colored areas, is avoided.

In the preferred practice of the invention both foreground and background scenes are recorded at the same time. For clarity of explanation, however, successive recording will be described first. The cartoon representation of Fig. 3 is placed in position over the large lens 17 and is held in proper registration by the pins 24 on the supporting frame 23. Then, with the projector 10 on, and the spotlights 29 and 29' off, an exposure is made of a frame of the photographically sensitive film 21 in camera 18. At this point in the process the apparatus is in the condition shown in Fig. 5. From the point of view of the camera the enlarged projected image is seen with a portion thereof masked by the opaque representation 25. This is illustrated in Fig. 5 by showing the projected image of the background scene and the opaque silhouette of the cartoon representation at the surface of lens 17, but it will be understood that the projected image is not visible on the surface of the lens except from the point of view of the camera. From any other point of view only the opaque silhouette will be visible.

Figure 6:
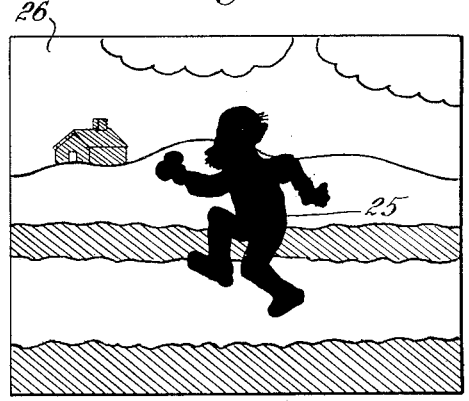
Fig. 6 illustrates the appearance of the image seen from the point of view of the camera when the illumination is that of Fig. 5.

Fig. 6 shows on a larger scale the image seen by the camera in Fig. 5. The positive background 26 is shown with an opaque silhouette of the cartoon representation 25 incorporated therewith. The image recorded on the film 21 in the camera during this exposure will be a negative of that of Fig. 6; that is, the background will be negative and the cartoon representation a clear silhouette.

Figure 7:
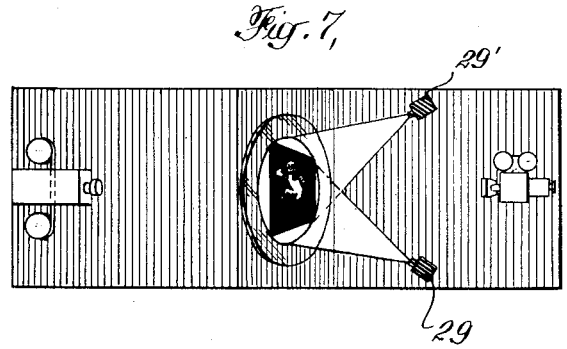
Fig. 7 is a top view similar to Fig. 5 showing the apparatus with the projector off and the detailed surface of the cartoon illuminated by spotlights.

The next step in the process is to extinguish the projector lamp and turn on the spotlights 29, 29' as shown in Fig. 7. It will be understood that the recording apparatus is placed in a suitable container, or in a dark room, etc., so that extraneous illumination is avoided. For this condition of the apparatus the background is dark, since the large lens and those parts of the transparent sheet 27 not covered by the cartoon representation reflect little light. By properly positioning the spotlights 29, 29' most of the small amount of light that is reflected from the background may be prevented from entering the camera lens, if this light should be objectionable.

Figure 8:
Fig. 8 illustrates the appearance of the image seen from the point of view of the camera when the illumination is that of Fig. 7.

The light which falls on the cartoon representation, however, illuminates the cartoon and presents the full detail of character 25 to the camera. Fig. 8 illustrates on a larger scale the cartoon image which the camera sees in Fig. 7. The portions of the image space previously occupied by the background scene are now dark. A second exposure of the same frame of film 21 previously exposed as in Fig. 5 is now made. During this exposure the parts of the film frame previously exposed to the projected background scene remain unaffected, since substantially no light reaches the film from the corresponding portions of the image space. The reflected light from the detailed cartoon representation, however, adds detail to the previously unexposed clear silhouette of the representation, thus completing the image on the film 21 in the camera. The intensity of illumination produced by the spotlights should be adjusted with respect to the intensity of the background image so as to give the proper balance between foreground and background on the recording film.

Figure 9:
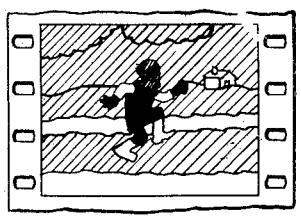
Fig. 9 illustrates a negative film-frame image created by the exposure of the film simultaneously or successively to the images of Fig. 6 and Fig. 8.

When the completed image on film 21 is developed it will appear as in Fig. 9. The blacks and whites of the background and cartoon representation are reversed from those of Figs. 6 and 8, and the scenes are reversed from right to left, since the film image is a negative.

Successive frames of the animated cartoon picture may be recorded on film 21 by placing cartoon representations showing successive action poses on the frame 23 in the correct order and projecting the same or successive frames of the background scene recorded on film 11. Successive frames of film 21 in the camera are then exposed alternately to the projected background scene, with the detailed side of the cartoon representation not illuminated, and to the illuminated cartoon representation with the projector off.

As previously mentioned, the preferred procedure is to take both foreground and background simultaneously. This is accomplished by turning on both projector and spotlights, regulating the relative intensities of the images to obtain proper balance between background and foreground, and photographing the combined image. It will be apparent from the foregoing discussion that the combined picture shown in Fig. 9 will be obtained by this procedure also.

It will be recognized that the optical system herein described utilizes the projected light very efficiently, unlike the ground glass plate used in apparatus heretofore proposed. This has several advantages. Due to the fact that the motion picture film 11 in the projector 10 must be stationary during the recording of the picture, instead of moving fairly rapidly as in ordinary motion picture projection, care must be taken not to set fire to the film. Some means of artificially cooling the film during projection is therefore ordinarily employed. Even so, the efficiency of the optical system assists in obtaining desirable speed in recording without danger of igniting the projection film. Furthermore, the brightness of the projected image permits using fairly bright spotlights, thereby facilitating the obtaining of proper balance between foreground and background illumination.

Figure 10:
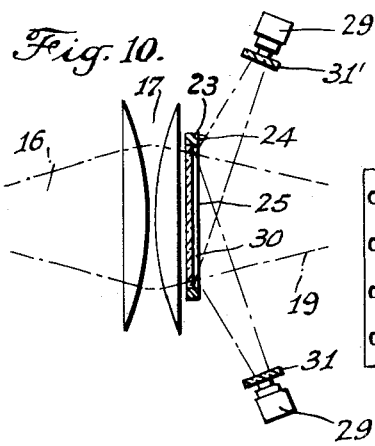
Fig. 10 is a detail of a portion of the apparatus of Fig. 1, showing in addition a filter for preventing reflection from the large lens.

In some cases it may be desirable to eliminate reflection of the light from the spotlights to the camera from any of the surfaces of the large lens 17. This may be so especially when the lens is not corrected for this type of flare, due to the expense involved. Such reflections may be avoided by placing a filter between the large lens and the cartoon representation which will pass at least part of the projected beam of light but which will be substantially opaque to the light from the spotlights. This feature is shown in Fig. 10. A filter 30, for example, a green filter, is placed over the large lens 17 in the plane of the frame 23. Thus the filter 30 is between the large lens and the cartoon representation 25, as mentioned just above. The spotlights 29 and 29' are provided with red filters 31 and 31' which are complementary to the green filters. The green filter will transmit the green portion of the projected light beam, thus allowing the camera to record the projected background image, but will not transmit the red light from the spotlights, and thus no red light reaches the surfaces of the lens. The red light will illuminate the cartoon representation, however, and thus the camera will still be able to photograph it.

The intensities of the projected beam and the illumination of the spotlights should be so adjusted with respect to the sensitivity of the film 21 to the respective colors as to give the proper balance between background and foreground scenes. Also, specular reflection from the surface of the red filter and the surface of the cartoon cell should be avoided by properly positioning the spotlights with respect to the camera.

Instead of placing the green filter over the entire area of the large lens, so as to prevent any red light from reaching the lens, as is preferred, it might be placed, in some cases, elsewhere in the path of the red light to the reflecting surfaces, or from those surfaces to the camera, and thereby prevent any reflected rays from reaching the camera. Similarly, one or both of the elements of lens 17 might be made of selectively colored glass. Also, the filters need not necessarily be of the colors specified, so long as the filter at the lens accomplishes the result of transmitting at least a part of the projected light, and not transmitting an objectionable amount of the light illuminating the cartoon representation. In general, any complementary color filters or filters of sharper cut wavelengths not common to each other may be used. Similarly, suitable polarizing filters might be used instead of color filters.

The optical elements of the apparatus need not necessarily be aligned as shown in Fig. 1 (in which figure the camera and projector are on opposite sides of the cartoon cell both physically and optically), but suitable reflecting prisms, mirrors, etc. may be introduced into the optical axis to turn the path of the light rays at right angles or other angles, for the purpose of making the apparatus compact, readily accessible, etc. It will be understood that the camera is optically on the side of the cartoon cell away from the projector, and optically away from the side on which the projected rays initially impinge on the cartoon cell. Whether or not the camera and projector are optically on opposite sides of the plane of the cartoon cell is determined with respect to the optical axis of the system. If reflecting prisms, mirrors, etc. are used to introduce right angles or other angles into the optical axis, as mentioned before, the camera and projector may still be optically on opposite sides of the cartoon cell.

The adjustment of the optical system described hereinbefore may be departed from to some extent, if desired. For example, the enlarged projected image need not be focussed substantially at the surface of the large lens toward the camera, but the plane of the image may be removed from the lens a considerable distance and still permit the proper functioning of the apparatus. In such case the effect of the large lens on the position of the projected image might need to be considered. However, the adjustment described is preferable so as to minimize the effect of lens aberrations and to minimize the required diameter of the large lens. Also, the plane of the projected image and the plane of the cartoon representation may be separated somewhat, instead of made to coincide, with resultant slight diffusion of the recorded image. Likewise, the camera need not be precisely focussed at the plane of the cartoon representation or background image, with resultant slight diffusion. Furthermore, films 11 and 21 may be other than motion picture film, if desired, and the cartoon cell may be other than hand-drawn. Also, a lightly diffusing medium may be placed at the image plane to facilitate the work of the operator by enabling him to see the projected image without placing his eye at the position of the camera. If such a medium is used, however, it is preferably withdrawn for taking in order to avoid introducing the granularity of the diffusing medium in the recorded picture.

It will now be apparent that the present invention provides means whereby an aerial image of large size can be successfully photographed in its entirety, and also means whereby such an aerial image can be combined with a desired cartoon representation and then photographed. The method and apparatus can be used to record color motion pictures as well as the black and white type. For example, film 11 might contain a background scene recorded in natural colors, and the cartoon 25 might be drawn in colors. The combined image would then contain all the desired colors and could be recorded by the camera by any suitable color recording process. Other procedures could also be devised for recording the pictures in color. It will also be apparent that many details of the method and apparatus herein described may be modified or changed without departing from the spirit and scope of the invention, as defined in the claims.

We claim:

1. Apparatus for photographically recording images containing a background and a separately prepared pictorial representation as a foreground which comprises a projector adapted to project to an image plane an enlarged image of a recorded background scene, a camera positioned and adapted to focus on said image plane, converging means positioned and adapted to converge the light rays forming an image in said image plane to said camera, said converging means comprising a large diameter converging lens positioned in the path of the projected rays near said image plane and on the side thereof toward the projector, means for positioning in the path of said rays near the said image plane a pictorial representation substantially opaque to the said rays and showing desired detail at the side thereof toward the camera, said projector, camera, image plane and converging means being so arranged that the projected rays do not impinge on the pictorial representation on the side thereof optically toward the camera, means for illuminating the detailed side of said pictorial representation, and means for recording with said camera said pictorial representation and the portion of the enlarged image not masked thereby.

2. Apparatus for photographically recording motion picture film images of the animated cartoon type which comprises a projector adapted to project to an image plane an enlarged image of a recorded background scene, said projector having a substantially point projection light source and a condenser which forms an image of the light source substantially at the projection lens, a camera positioned and adapted to focus on said image plane, means for receiving and positioning in the path of the projected rays substantially at said image plane a cartoon cell bearing a cartoon representation substantially opaque to said projected rays and showing desired detail at the side thereof toward the camera, said enlarged image corresponding in size to the cartoon representation, a large diameter converging lens positioned near said image plane on the side thereof toward the projector and adapted to converge the projected rays forming said enlarged image to focus the said light source image substantially at the objective of the camera, the projector and the camera being positioned optically on opposite sides of the plane of said cartoon cell so that the camera photographs the side of the cartoon representation opposite that on which the projected rays impinge, means for illuminating the detailed side of said cartoon representation, and means for recording on film in said camera said cartoon representation and the portion of the enlarged image not masked thereby.

3. Apparatus for photographically recording images containing a background and a separately prepared pictorial representation as a foreground which comprises a projector adapted to project to an image plane an enlarged image of a recorded background scene, a camera positioned and adapted to focus on said image plane, converging optical means positioned in the path of the projected rays of light and adapted to converge rays forming an image in said image plane to said camera, means for positioning a pictorial representation substantially opaque to the projected light rays in the path of said rays near said image plane, means for illuminating the surface of said pictorial representation toward said camera, a filter positioned in the path of the projected rays on the farther side of said representation from the camera, said filter being at least partially transparent to the projected light rays but substantially opaque to said illumination whereby undesired reflections of said illumination to the camera may be avoided, and means for recording with said camera said pictorial representation and the portion of the enlarged image not masked thereby.

4. Apparatus for photographically recording motion picture film images of the animated cartoon type which comprises a projector adapted to project to an image plane an enlarged image of a recorded background scene, a camera positioned and adapted to focus on said image plane, means for receiving and holding a cartoon cell in the path of the projected rays substantially at said image plane, said cartoon cell bearing a cartoon representation showing desired detail at the side thereof toward the camera, a large diameter converging lens positioned near said image plane on the side thereof toward the projector and adapted to converge the rays forming said enlarged image to the objective of said camera, means for illuminating the detailed side of said cartoon representation, a filter positioned in the path of the projected rays between said cartoon cell and surfaces of said lens from which it is desired to avoid reflection of said illumination to said camera, said filter being at least partially transparent to the projected light rays but substantially opaque to said illumination, and means for recording on film in said camera said cartoon representation and the portion of the enlarged image not masked thereby.

5. Apparatus for photographically recording motion picture film images of the animated cartoon type which comprises a projector adapted to project to an image plane an enlarged image of a recorded background scene, a camera positioned and adapted to focus on said image plane, means for receiving and positioning in the path of the projected rays substantially at said image plane a cartoon cell bearing a cartoon representation showing desired detail at the side thereof toward the camera, said enlarged image corresponding in size to the cartoon representation, a large diameter converging lens positioned near said image plane on the side thereof toward the projector and adapted to converge the rays forming said enlarged image to the objective of said camera, the projector and the camera being positioned optically on opposite sides of the plane of said cartoon cell so that the camera photographs the side of the cartoon representation opposite that on which the projected rays impinge, means for illuminating the detailed side of said cartoon representation with selectively colored light, a color filter positioned in the path of the projected rays between said cartoon representation and said lens, said color filter being transparent to at least part of the wavelengths of the projected light but substantially opaque to said selectively colored light, and means for recording on film in said camera said cartoon representation and the portion of the enlarged image not masked thereby.

6. Apparatus for photographically recording motion picture film images of the animated cartoon type which comprises a projector adapted to receive a recorded image of a background scene and project an enlarged image thereof to an image plane, a camera positioned and adapted to photograph an image in said image plane, means for receiving and positioning a cartoon cell in the path of the projected rays near said image plane, said enlarged image and said cartoon cell corresponding to each other in size, and converging optical means positioned to converge rays forming said enlarged image to said camera, said projector, camera, image plane and converging optical means being arranged so that the projected rays impinge on the cartoon cell only at the side thereof away from the camera, whereby a photograph containing cartoon images in a separately recorded background scene may be obtained.

7. Apparatus for photographically recording images containing a background and a separately prepared pictorial representation as a foreground which comprises a projector adapted to receive a recorded image of a background scene and project an image thereof to an image plane, photographing means positioned and adapted to photograph an image in said image plane, converging optical means positioned in the path of the projected rays of light and adapted to converge rays forming an image in said image plane toward said photographing means, and means for positioning a pictorial representation substantially opaque to the projected light rays in the path of said rays near said image plane, said projector, photographing means, image plane and converging optical means being arranged so that the projected rays do not impinge on the pictorial representation on the side thereof toward said photographing means, whereby a photograph containing said pictorial representation and the portion of the projected image not masked thereby may be obtained.

8. Apparatus for photographically recording images containing a background and a separately prepared pictorial representation as a foreground which comprises a projector adapted to receive a recorded image of a background scene and project an image thereof to an image plane, said projector having a projection light source therein, means for receiving and positioning a pictorial representation in the path of the projected rays near said image plane, a camera positioned and adapted to photograph a pictorial representation positioned by said means, converging optical means positioned in the path of the projected rays of light and adapted to converge rays forming an image in said image plane to said camera, the projector and the camera being positioned optically on opposite sides of the plane of the pictorial representation so that the camera photographs the side of the pictorial representation opposite that on which the projected rays impinge, and means including said converging optical means for imaging said projection light source substantially at the objective of said camera.

9. Apparatus for photographically recording motion picture film images of the animated cartoon type which comprises a projector adapted to receive a recorded image of a background scene and project an enlarged image thereof to an image plane, means for receiving and positioning a cartoon cell in the path of the projected rays near said image plane, a camera positioned and adapted to photograph a cartoon cell positioned by said means, and a large diameter converging lens positioned and adapted to converge light rays forming said enlarged image to said camera, the projector and the camera being positioned optically on opposite sides of the plane of said cartoon cell, whereby a photograph containing cartoon images in a separately recorded background scene may be obtained.

10. Apparatus for photographically recording motion picture film images of the animated cartoon type which comprises a projector adapted to receive a recorded image of a background scene and project an enlarged image thereof to an image plane, means for receiving and holding in the path of the projected rays near said image plane a cartoon cell bearing a cartoon representation substantially opaque to said projected rays and showing desired detail on the side away from the impinging projected rays, means for illuminating the detail of said cartoon representation, a camera positioned and adapted to photograph the detailed side of said cartoon representation, and a large diameter converging lens positioned near said image plane and adapted to converge light rays forming said enlarged image to said camera, the projector and the camera being positioned optically on opposite sides of the plane of said cartoon cell so that the camera photographs the side of the cartoon cell opposite that on which the projected rays impinge on the opaque portions thereof, whereby the cartoon representation and the portions of the enlarged image not masked thereby may be photographed by said camera.

11. Apparatus for photographically recording motion picture film images of the animated cartoon type which comprises a projector adapted to receive a recorded image of a background scene and project an enlarged aerial image thereof to an image plane, said projector having a projection light source therein and condensing means for forming an image of the light source substantially at the projection lens, means for receiving and holding a cartoon cell in the path of the projected rays near said image plane, a camera positioned and adapted to photograph a cartoon cell held by said means, and a large diameter converging lens positioned and adapted to converge light rays forming said enlarged aerial image to said camera and to focus the said light source image substantially at the objective of the camera, the projector and the camera being positioned optically on opposite sides of the plane of said cartoon cell.

12. The method of photographically recording images containing a background and a separately prepared pictorial representation as a foreground which comprises projecting to an image plane an enlarged image of a recorded background scene, interposing in the path of the projected light rays near said image plane a pictorial representation substantially opaque to said rays, converging the light rays forming said enlarged image to photographing means positioned optically on the side of said pictorial representation opposite that on which the projected rays impinge, and recording with said photographing means said pictorial representation and the portion of the enlarged image not masked thereby, whereby an image having a desired pictorial representation incorporated with a separately prepared background scene may be produced.

13. The method of photographically recording images containing a background and a separately prepared pictorial representation as a foreground which comprises projecting to an image plane an enlarged image of a recorded background scene, interposing in the path of the projected light rays substantially at said image plane a pictorial representation substantially opaque to said rays, converging from a position near said image plane light rays forming said enlarged image to photographing means positioned to photograph said pictorial representation, the path of the projected rays being selected so that the projected rays do not impinge on the side of the pictorial representation optically toward the photographing means, and recording with said photographing means said pictorial representation and the portion of the enlarged image not masked thereby, whereby an image having a desired pictorial representation incorporated with a separately prepared background scene may be produced.

14. The method of photographically recording images containing a background and a separately prepared pictorial representation as a foreground which comprises projecting to an image plane an enlarged image of a recorded background scene, interposing in the path of the projected light rays near said image plane a pictorial representation substantially opaque to said rays and showing desired detail at the side thereof opposite that on which the projected rays impinge, converging light rays forming said enlarged image to photographing means positioned to photograph the side of said pictorial representation opposite that on which the projected rays impinge, illuminating the detailed surface of said representation, operably interposing in the path of the projected rays to said pictorial representation and on the side thereof away from the camera a filter at least partially transparent to the projected light rays but substantially opaque to the light rays illuminating said representation whereby undesired reflections of the illumination to the camera may be avoided, and recording with said camera said pictorial representation by means of light reflected from the detailed surface thereof and the portion of the enlarged image not masked thereby, whereby an image having a desired pictorial representation incorporated with a separately prepared background scene may be produced.

15. The method of photographically recording motion picture film images of the animated cartoon type which comprises projecting to an image plane an enlarged aerial image of a recorded background scene by means of a projector having a substantially point source of light as the projection source, interposing in the path of the projected light rays substantially at said image plane a cartoon cell having thereon a cartoon representation substantially opaque to said light rays and showing desired detail at the side thereof opposite that on which the projected rays impinge on the opaque portions thereof, said enlarged image corresponding in size to the cartoon representation, converging, by means of a large lens positioned near said image plane on the side thereof toward the projector, light rays forming said enlarged aerial image to image said projection point source substantially at the objective of a camera positioned to photograph the side of said cartoon representation opposite that on which the projected rays impinge, illuminating the detailed side of the cartoon representation, and photographing on a single film-frame in said camera said cartoon representation and the portion of the enlarged image not masked thereby.

16. The method of photographically recording motion picture film images of the animated cartoon type which comprises projecting to an image plane an enlarged image of a recorded background scene by means of a projector, interposing in the path of the projected light rays near said image plane a cartoon cell having thereon a cartoon representation substantially opaque to said light rays and showing desired detail at the side thereof opposite that on which the projected rays impinge on the opaque portions thereof, said enlarged image corresponding in size to the cartoon representation, converging light rays forming said enlarged image to a camera positioned optically on the side of the image plane away from the projector so as to photograph the side of said cartoon representation opposite that on which the projected rays impinge, illuminating the detailed side of the cartoon representation with light of selected color, eliminating undesired reflections of said illumination from surfaces in the path of the projected light beam on the farther side of said representation from the camera by interposing between said surfaces and said representation a color filter transmitting at least part of the wave length of the projected rays but substantially opaque to said illumination, and photographing on a single film-frame in said camera said cartoon representation and the portion of the enlarged image not masked thereby.

17. The method of photographically recording motion picture film images of the animated cartoon type which comprises projecting to an image plane an enlarged aerial image of a recorded background scene by means of a projector having a substantially point source of light as the projection source, interposing in the path of the projected light rays substantially at said image plane a cartoon cell having thereon a cartoon representation substantially opaque to said light rays and showing desired detail at the side thereof opposite that on which the projected rays impinge on the opaque portions thereof, said enlarged image corresponding in size to the cartoon representation, converging, by means of a large lens positioned near said image plane on the side thereof toward the projector, light rays forming said enlarged image to image said projection point source substantially at the objective of a camera positioned optically on the side of the image plane away from the projector so as to photograph the side of said cartoon representation opposite that on which the projected rays impinge, illuminating the detailed side of the cartoon representation with light of selected color, positioning between said cartoon representation and said lens a color filter substantially opaque to said light of selected color but transmitting at least part of the wave lengths of the projected rays, and photographing on a single film-frame in said camera said cartoon representation and the portion of the enlarged image not masked thereby.

18. Apparatus for photographically recording motion picture film images of the animated cartoon type which comprises a projector adapted to receive a recorded image of a background scene and project an enlarged aerial image thereof to an image plane, means for receiving and positioning in the path of the projected rays substantially at said image plane a cartoon cell bearing a cartoon representation substantially opaque to said projected rays and showing desired detail at the side thereof opposite that on which the projected rays impinge, said enlarged image corresponding in size to the cartoon representation, a camera positioned and adapted to photograph the side of said cartoon representation opposite that on which the projected rays initially impinge, light converging means optically arranged to converge the rays forming said enlarged aerial image to the objective of said camera comprising a large diameter converging lens positioned near said image plane on the side thereof toward the projector, means for illuminating the detailed side of said cartoon representation, and means for recording on film in said camera said cartoon representation and the portion of the enlarged image not masked thereby.

19. Apparatus for photographically recording motion picture film images of the animated cartoon type which comprises a projector adapted to receive a recorded image of a background scene and project an enlarged image thereof to an image plane, means for receiving and positioning in the path of the projected rays near said image plane a cartoon representation substantially opaque to the projected rays, a camera positioned and adapted to photograph a cartoon representation positioned by said means, and converging optical means positioned and adapted to converge rays forming said enlarged image to said camera comprising a large diameter converging lens positioned near said image plane, said projector, camera, image plane and converging optical means being arranged so that the projected rays impinge on the cartoon representation only at the side thereof away from the camera, whereby a photograph containing said cartoon representation and the portion of the projected image not masked thereby may be obtained.

20. Apparatus for photographically recording images containing a background and a separately prepared pictorial representation as a foreground which comprises a projector adapted to receive a recorded image of a background scene and project an enlarged image thereof to an image plane, means for positioning a pictorial representation substantially opaque to the projected light rays in the path of said rays near said image plane, a camera positioned optically on the side of said pictorial representation opposite that on which the projected rays initially impinge so as to photograph said side, and converging optical means positioned and adapted to converge the rays forming said enlarged image to said camera, whereby a photograph containing said pictorial representation and the portion of the projected image not masked thereby may be obtained.

21. The method of photographically recording motion picture film images of the animated cartoon type which comprises projecting to an image plane an enlarged image of a recorded background scene, interposing in the path of the projected light rays near said image plane a cartoon cell having thereon a cartoon representation substantially opaque to said light rays, said enlarged image corresponding in size to the cartoon representation, converging from a position near said image plane the light rays forming said enlarged image to photographing means positioned optically on the side of said cartoon representation opposite that on which the projected rays impinge, and recording with said photographing means the said cartoon representation and the portion of the enlarged image not masked thereby, whereby an image having a desired cartoon representation incorporated with a separately recorded background scene may be produced.

CARL LOUIS GREGORY.
PAUL HOULTON TERRY.